United States Patent
Miyazawa et al.

(10) Patent No.: US 6,893,758 B2
(45) Date of Patent: May 17, 2005

(54) FUEL CELL SYSTEM AND METHOD OF STOPPING THE SYSTEM

(75) Inventors: Atsushi Miyazawa, Yokosuka (JP); Toshihiro Takekawa, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 76 days.

(21) Appl. No.: 10/398,895

(22) PCT Filed: Oct. 25, 2002

(86) PCT No.: PCT/JP02/11078

§ 371 (c)(1),
(2), (4) Date: Apr. 11, 2003

(87) PCT Pub. No.: WO03/043113

PCT Pub. Date: May 22, 2003

(65) Prior Publication Data

US 2004/0081870 A1 Apr. 29, 2004

(30) Foreign Application Priority Data

Nov. 13, 2001 (JP) ..................................... 2001-347337

(51) Int. Cl.[7] ...................... H01M 8/04; H01M 10/46; H01M 16/00
(52) U.S. Cl. ................. 429/24; 429/26; 429/9; 429/13; 320/101
(58) Field of Search ................................ 429/24, 26, 9, 429/13; 320/101

(56) References Cited

FOREIGN PATENT DOCUMENTS

| JP | 59-73858 | 4/1984 | | |
|----|----------|--------|---|---|
| JP | 62-131478 | 6/1987 | | |
| JP | 7-169475 | 7/1995 | | |
| JP | 7-169476 | 7/1995 | | |
| JP | 11-214025 | * 8/1999 | ............ | H01M/8/04 |
| JP | 2001-143736 | 5/2001 | | |
| JP | 2001-185179 | 7/2001 | | |
| JP | 2001-332281 | 11/2001 | | |

* cited by examiner

*Primary Examiner*—Patrick Ryan
*Assistant Examiner*—Angela J. Martin
(74) *Attorney, Agent, or Firm*—McDermott Will & Emery LLP

(57) ABSTRACT

When a fuel cell system is to be stopped, a controller 3 decreases the coolant flowrate to a fuel cell 1, decreases the cooling performance of the fuel cell 1 and continues operation of the fuel cell 1, and performs a temperature rise operation wherein the temperature of the fuel cell 1 is increased using the heat generated by the electrochemical reaction in the fuel cell 1. After the temperature of the fuel cell 1 has reached a predetermined high temperature, the operation of the fuel cell 1 is stopped.

15 Claims, 4 Drawing Sheets

FUEL CELL SYSTEM AND METHOD OF STOPPING THE SYSTEM

FIELD OF THE INVENTION

This invention relates to a fuel cell system, method of stopping it and to prevention of freezing of the fuel cell.

BACKGROUND OF THE INVENTION

In some fuel cells such as a polymer electrolyte fuel cell, which generates power using energy produced by a chemical reaction between hydrogen and oxygen, it is necessary to humidify the fuel cell to permit the fuel cell to function. The fuel cell itself generates heat when it generates power, so a cooling system is required which cools the fuel cell by cooling water or the like.

In a fuel cell system comprising a fuel cell using water, if the system is left below freezing point when it has stopped, the water or cooling water in the cell freezes and can cause damage or interfere with restart of the fuel cell system. JP7-169475A published in 1995 and JP11-214025A published by the Japanese Patent Office proposes a method for preventing freezing of the fuel cell.

SUMMARY OF THE INVENTION

However, according to the methods of the prior art, when the fuel cell temperature dropped or the outside air temperature dropped, the fuel cell was heated by a burner or the like from outside or it was automatically restarted. If this type of processing is automatically performed during stop regardless of the driver's intention, it is not very desirable from the viewpoint of safety, etc.

It is therefore an object of this invention to heat a fuel cell during system stop and prevent freezing of the fuel cell without the need to heat or restart.

In order to achieve above object, the present invention provides a fuel cell system, comprising a fuel cell which generates power by an electrochemical reaction, a cooling mechanism which cools the fuel cell, and a controller which, when the system is to be stopped, functions to decrease the cooling performance of the cooling mechanism and continuously operate the fuel cell to raise the temperature of the fuel cell using the heat of the electrochemical reaction, and stop operation of the fuel cell after the temperature of the fuel cell has risen.

According to an aspect of the invention, the present invention provides a method of stopping a fuel cell system provided with a fuel cell which generates power by an electrochemical reaction and a cooling system which cools the fuel cell, comprising decreasing the cooling performance of the cooling device of the fuel cell and continuously operating the fuel cell before the system stops, and raising the temperature of the fuel cell using the heat generated by the electrochemical reaction of the fuel cell.

The details as well as other features and advantages of this invention are set forth in the remainder of the specification and are shown in the accompanying drawings.

DESCRIPTION OF THE PREFERRED EMBODIMENTS

Figure 1:
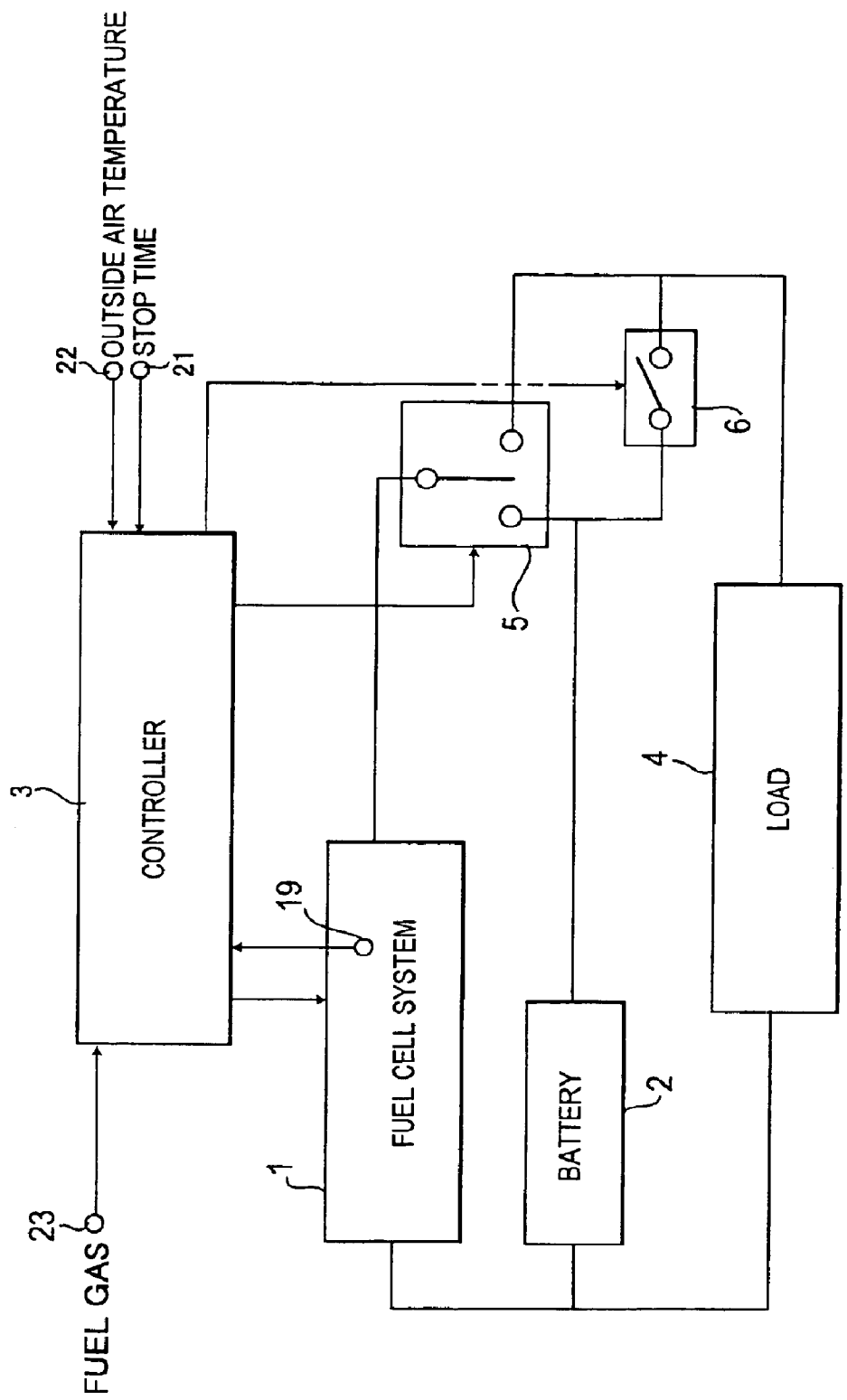
FIG. 1 is a schematic view of a vehicle comprising a fuel cell system according to this invention.

Referring to FIG. 1 of the drawings, a vehicle with a fuel cell system 1 according to this invention comprises a controller 3 which controls the fuel cell system 1, a battery 2 charged by power generated by the fuel cell system 1, and switches 5, 6. The fuel cell system 1 is connected to a load 4.

The fuel cell system 1 is a polymer electrolyte fuel cell (PEFC) (or phosphoric acid fuel cell (PAFC)), and it is a fuel cell which requires humidification during operation. The controller 3 comprises one, two or more microprocessors, a memory, and an input/output port. When the fuel cell system 1 is to be stopped, the controller 3 performs temperature rise operation of the fuel cell system 1 described hereafter.

The load 4 is a motor which receives power from the fuel cell system 1 and generates drive force. The drive force of the motor is transmitted to the drive wheels of the vehicle via the vehicle shaft.

The fuel cell system 1 can be connected to the load 4 and battery 2 via the switches 5, 6. When the system is running, the fuel cell system 1 and the load 4 are connected, and during temperature rise operation which is performed when the fuel cell system 1 is to be stopped, the fuel cell system 1 and battery 2 are connected. The battery 2 is a chargeable secondary cell such as a nickel cadmium battery, lithium battery or nickel hydrogen battery.

Figure 2:
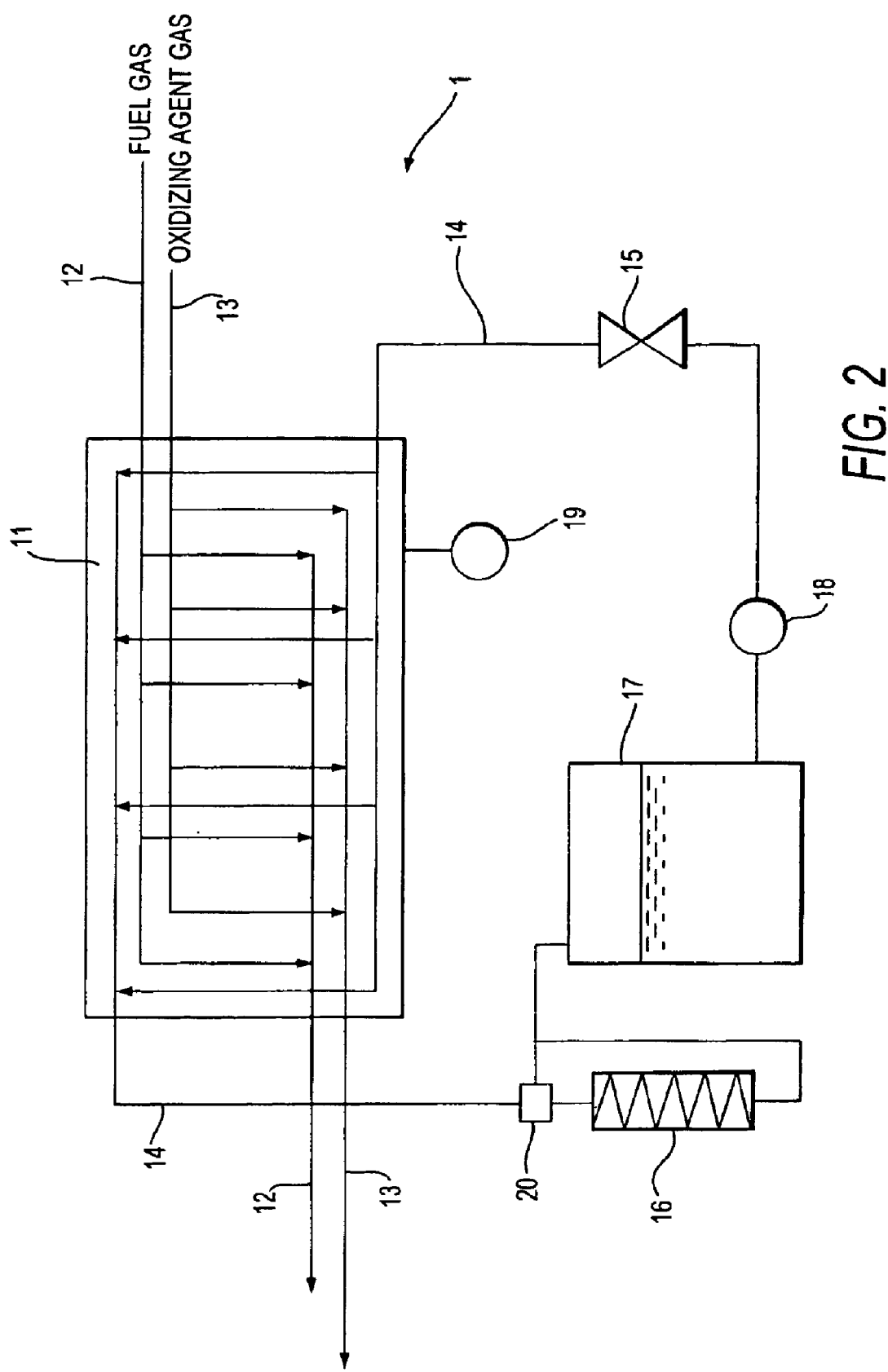
FIG. 2 is a schematic view of the fuel cell system.

FIG. 2 shows the schematic construction of the fuel cell system 1. A fuel cell 11 of the fuel cell system 1 has a stack construction wherein plural cells are laminated. In the fuel cell 11, fuel gas such as hydrogen is supplied to the cathode, and an oxidizing agent gas such as air, oxygen is supplied to the anode. The fuel cell 11 obtains electromotive force by the following chemical reactions:

$$H_2 \rightarrow 2H^+ + 2e^- \qquad (1)$$

$$(\tfrac{1}{2})O_2 + 2H^+ + 2e^- \rightarrow H_2O \qquad (2)$$

$$H_2 + (\tfrac{1}{2})O_2 \rightarrow H_2O \qquad (3)$$

Equation (1) is an anode reaction, and equation (2) is a cathode reaction. The equation (3) is a chemical reaction which occurs throughout the fuel cell 11.

The fuel cell system 1 further comprises a pipe 12 which supplies fuel gas, a pipe 13 which supplies oxidizing agent gas, and a pipe 14 which supplies a coolant (cooling water), a heat exchanger 16 which performs heat exchange between the coolant and the outside air, a coolant tank 17, a valve 15 which adjusts the flowrate of the coolant, a pump 18 which circulates the coolant, a temperature sensor 19 which detects the temperature of the fuel cell 11 and a pipe selection valve 20.

When the fuel cell system 1 is to be stopped, the cooling function of the fuel cell 11 is reduced, the above electrochemical reactions are continued, and the temperature of the fuel cell 11 rises due to the heat generated by the fuel cell 11. A membrane electrode, a gas diffusion layer and a separator, which are used in PEFC, have heat resistance up to a certain temperature, so the fuel cell 11 can be heated to the heat resistance temperature.

The heat exchanger 16 has the function of lowering the temperature of the coolant which has passed through the fuel cell 11, but when the temperature of the fuel cell 11 is being raised, the cooling function may be reduced by lowering the circulation flowrate of the coolant. Further, the coolant may be made not to pass through the heat exchanger 16 by changing the pipe selection valve 20, in which case the cooling function of fuel cell 11 is further reduced and the temperature rise effect of the fuel cell 11 is enhanced. Considering that steam will accumulate in the fuel cell 11 when the temperature rises, a gas purge outlet may be installed in the fuel cell 11.

Figure 3:
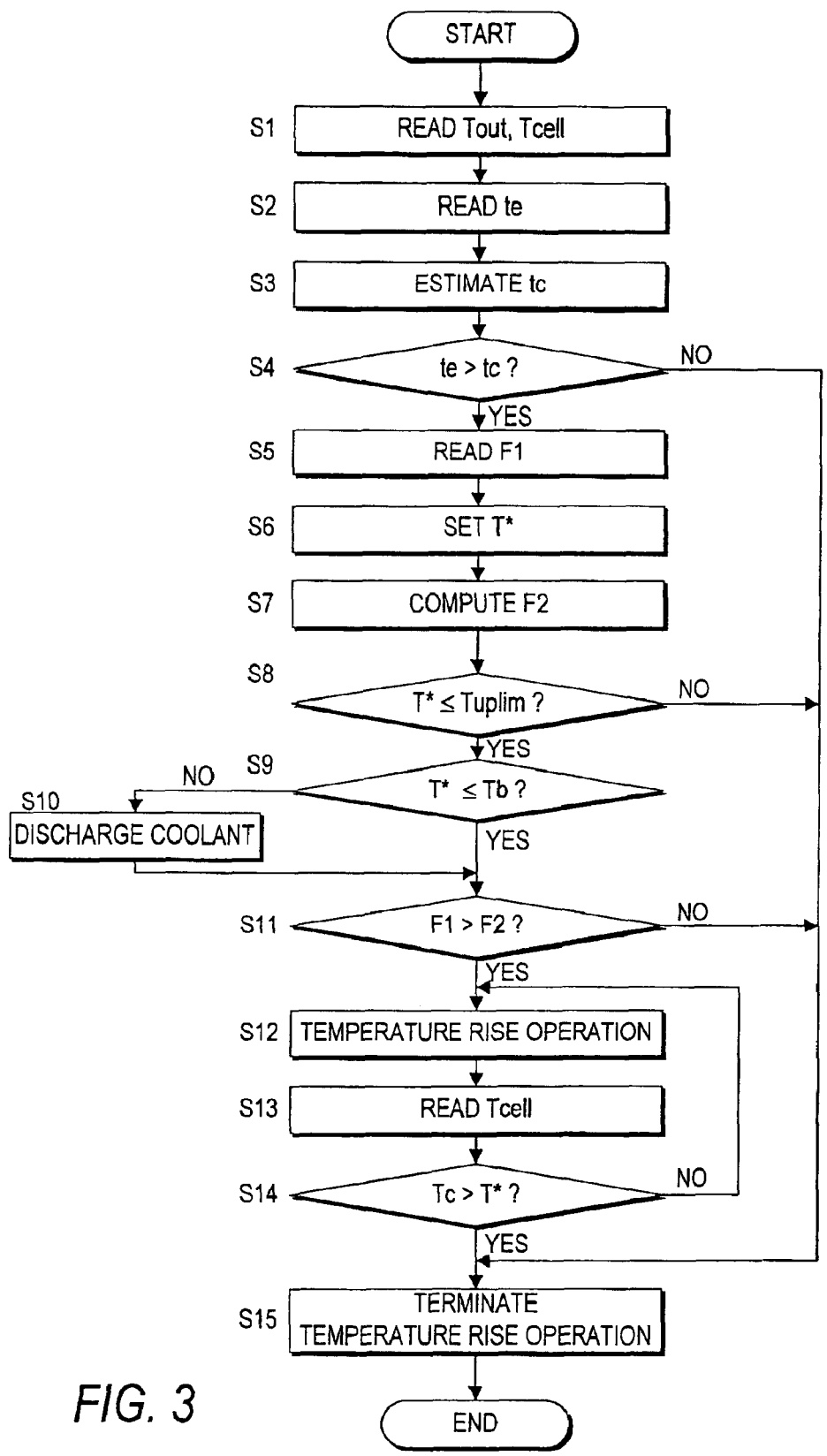
FIG. 3 is a flowchart showing the details of a temperature rise operation of the fuel cell.

Next, the temperature rise operation of the fuel cell 11 performed when the fuel cell system 1 is to be stopped, will be described referring to the flowchart showing in FIG. 3. This flowchart is executed by the controller 3 when the fuel cell system 1 is to be stopped.

When the fuel cell system 1 is to be stopped, firstly, a cell temperature (hereafter, fuel cell temperature) Tcell of the fuel cell 11 detected by the temperature sensor 19, and an outside air temperature Tout detected by a temperature sensor 22, are read (step S1). A stop time te predicted by the driver and input via an input device 21 connected to the controller 3 is read (step S2), and it is determined whether or not temperature rise operation of the fuel cell should be performed based on this and the outside air temperature Tout.

Specifically, a time (hereafter, cooling time) tc until the fuel cell 1 cools by naturally losing heat to a predetermined low temperature Tlow (e.g., 0° C.), is estimated (step S3). Thus, by determining whether or not this cooling time tc is longer than the system stop time te, it is determined whether or not it is necessary to perform a temperature rise operation (step S4).

When the system stop time te is shorter than the cooling time tc, the fuel cell temperature Tcell does not fall to the above predetermined low temperature Tlow on the next startup even if temperature rise operation is not performed, so the fuel cell 11 is stopped without performing temperature rise operation (steps S4→S15). In this way, an unnecessary temperature rise operation is prevented, and fuel consumption is suppressed. However, even in this case, a suitable temperature rise may be given by referring to the temperature variation history of the outside air temperature Tout. For example, if the outside air temperature Tout is falling and it is determined that the fuel cell temperature Tcell can fall to the predetermined low temperature Tlow, the temperature rise operation may be performed.

On the other hand, when the stop time te is longer than the cooling time tc, a temperature rise operation is performed, and the fuel cell temperature Tcell is raised to a predetermined high temperature T* so that the temperature of the fuel cell 11 does not fall to the predetermined low temperature Tlow at which freezing occurs until the system restarts (steps S6–S14).

Here, as the rate at which the fuel cell temperature Tcell falls, increases the lower the outside air temperature Tout becomes or the longer the system stop time te becomes, the predetermined high temperature T* is set to a higher temperature, the lower the outside air temperature Tout becomes and the longer the system stop time te becomes (step S6). Also, the predetermined high temperature T* may be varied depending on whether or not the outside air temperature Tout falls below freezing point.

If the system stop time te is long, as the stop time te is too long compared to the cooling time tc, it may occur that the temperature cannot be raised to the temperature T* required to prevent freezing even if all the residual fuel amount F1 is used for the temperature rise operation. In such a case, the temperature rise of the fuel cell 11 is therefore decreased or the temperature rise operation is interrupted. To decrease the temperature rise of the fuel cell 11, the temperature rise operation may be shortened or cooling performance losses may be reduced. The reason for this is that temperature rise operation would be useless even if temperature rise operation was performed. Specifically, the residual fuel amount F2 required to raise the fuel cell temperature Tcell to the predetermined temperature T* is computed (step S7), and when the required fuel amount F2 is larger than the residual fuel amount F1 read in the step S5, temperature rise running is performed only slightly or not at all (steps S11→S15). The required fuel amount F2 can be computed based on the current fuel cell temperature Tcell.

When the predetermined high temperature T* is set to such a high temperature that it affects the fuel cell components (T*>Tuplim), it causes the functional degeneration of the fuel cell 11, so temperature rise of the fuel cell due to temperature rise operation is reduced or not performed at all (steps S8→S15). The upper limiting temperature Tuplim can be previously read into the control program, and this can be set within a range so that it does not affect the deterioration of the components of the fuel cell 11.

The residual fuel amount F1 read in the step S5 is the residual amount of hydrogen in a direct hydrogen fuel cell system where stored hydrogen is directly supplied to the fuel cell, and is the residual amount of hydrocarbon fuel in a reformate fuel cell system where hydrogen obtained by reforming a hydrocarbon fuel such as methanol is supplied to the fuel cell. This is detected by a residual fuel amount sensor 23 attached for example to a fuel tank. The residual fuel amount F1 may also be calculated by calculating the fuel consumption amount when the tank is full, and subtracting the fuel consumption amount from the maximum capacity of the fuel tank.

When the system stop time te is longer than the cooling time tc, and a temperature rise operation is required within a range permitted by the fuel amount F1 (F1>F2), the temperature rise operation is performed until the temperature of the fuel cell 1 rises to the predetermined temperature T* (steps S9–S14). The temperature rise operation is performed by decreasing the opening of the valve 15 to decrease the flowrate of coolant to the fuel cell 11, or by stopping the pump 18 so as to stop the supply of coolant to the fuel cell 11 and operate the fuel cell 11 continuously by supplying fuel to the fuel cell 11.

When the predetermined temperature T* is high and it is required to enhance the temperature rise effect, the coolant is not passed through the heat exchanger 16 by changing the pipe selection valve 20. Further, when T* is higher than the boiling point Tb of the coolant and it is required to raise the fuel cell temperature Tcell above Tb, the coolant is discharged from the fuel cell 11, the fuel cell 11 is operated and the temperature of the fuel cell 11 is thereby increased (steps S9→S10).

This temperature rise operation is continued until the fuel cell temperature Tcell detected by the temperature sensor 19 reaches the predetermined high temperature T*, and when it reaches the predetermined temperature T*, supply of fuel gas and oxidizing agent gas to the fuel cell 11 is stopped and operation of the fuel cell 11 is stopped (step S15).

Here, the temperature rise operation was continued until the fuel cell temperature Tcell reaches the predetermined temperature T*, however the time required to heat the fuel cell 11 from a certain temperature to the predetermined temperature T* can previously be stored in the form of, for example, a table or map in the memory of the controller 3, and it may be determined that the fuel cell temperature Tcell has reached the predetermined temperature T* when the elapsed time from temperature rise operation startup reaches a predetermined time obtained by looking up the table or map.

The power generated by the fuel cell 11 in the temperature rise operation is stored by the battery 2, so it is possible to raise the temperature of the fuel cell 1 with little energy loss. The power stored by the battery 2 may for example subsequently be used as power to restart the system or power used while the fuel cell 11 stops.

Figure 4:
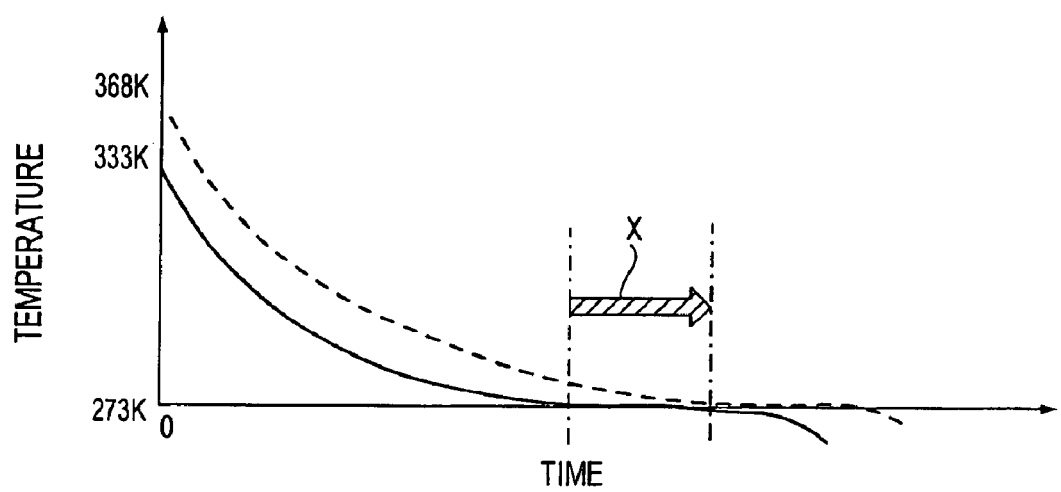
FIG. 4 is a time chart showing the fuel cell temperature variation after system stop.

FIG. 4 shows the results of a fuel cell temperature drop experiment carried out to investigate the effect of temperature rise operation according to this invention. In the experiment, a fuel cell comprising ten cells insulated by an adiabatic material was placed in a constant temperature room at a fixed temperature of −10° C., and insulation was also placed around the pipes to avoid heat losses as far as possible.

The solid line in the figure shows the fuel cell temperature variation when this invention was not applied, i.e., the fuel cell was operated continuously at a current density of $1A/cm^2$ until the cell temperature and temperature of the circulating coolant were constant (333K), the fuel cell was stopped, and then left as it was. On the other hand, the broken line in the figure shows the fuel cell temperature variation when this invention was applied, i.e., the coolant circulation flowrate was controlled to raise the temperature of the fuel cell, the fuel cell was stopped when the cell temperature reached 368K, and then left as it was. In both cases, the start time-when the fuel cell was left was taken as zero.

As shown in FIG. 4, if the fuel cell temperature is increased when the fuel cell is to be stopped, the fuel cell temperature is maintained high after it has stopped and the time at which the fuel cell begins to freeze can be delayed as shown by the arrow X in the figure. According to this invention, the fuel cell temperature is sufficiently increased before the fuel cell stops depending on the outside air temperature, so the fuel cell can be restarted before the fuel cell freezes, and freezing of the fuel cell is prevented.

It may be noted that the time until freezing temperature is reached can be further extended by applying suitable insulation between the fuel cell and the exterior as in this embodiment.

The entire contents of Japanese Patent Application P2001-347337 (filed Nov. 13, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

INDUSTRIAL FIELD OF APPLICATION

This invention can be applied to various types of fuel cell including those used in vehicles, and is effective for preventing freezing when the fuel cell system is stopped in an environment below freezing point. In particular, a burner does not operate automatically while the system is stopped and the system is not automatically restarted, so the safety of the vehicle when applied to a vehicle fuel cell system is enhanced.

What is claimed is:

1. A fuel cell system, comprising:
   a fuel cell (11) which generates power by an electrochemical reaction,
   a cooling mechanism (15–18) which cools the fuel cell (11), and
   a controller (3) which, when the system is to be stopped, functions to:
   decrease the cooling performance of the cooling mechanism (15-18) and continuously operate the fuel cell (11) to raise the temperature of the fuel cell (11) using the heat of the electrochemical reaction, and
   stop operation of the fuel cell (11) after the temperature of the fuel cell (11) has risen.

2. The fuel cell system as defined in claim 1, further comprising a sensor (19) which detects the temperature of the fuel cell (11), wherein the controller (3) further functions to stop the temperature rise operation when the temperature of the fuel cell (11) has reached a predetermined temperature.

3. The fuel cell system as defined in claim 1, wherein the controller (3) further functions to stop the temperature rise operation when it is determined that the temperature of the fuel cell (11) has reached a predetermined temperature based on the time for which the temperature rise operation has continued.

4. The fuel cell system as defined in claim 2 or 3, further comprising a sensor (22) which detects the outside air temperature of the fuel cell (11), wherein the controller (3) further functions to set the predetermined temperature to be higher, the lower the outside air temperature is.

5. The fuel cell system as defined in claim 2 or 3, further comprising an input device (21) for inputting a stop time after the system stops until the system is next restarted, wherein the controller (3) further functions to set the predetermined temperature to be higher, the longer the stop time is.

6. The fuel cell system as defined in claim 2 or 3, further comprising:
   an input device (21) for inputting a stop time after the system stops until the system is next restarted,
   a sensor (19) which detects the temperature of the fuel cell (11), and
   a sensor (22) which detects the outside air temperature of the fuel cell (11), wherein the controller (3) further functions to set the predetermined temperature based on the stop time, fuel cell temperature and outside air temperature.

7. The fuel cell system as defined in claim 2 or 3, wherein:
   the controller (3) further functions not to perform temperature rise operation when the temperature of the fuel cell (11) cannot be increased to the predetermined temperature even if all the remaining fuel is used for the temperature rise operation.

8. The fuel cell system as defined in any one of claims 1 to 3, further comprising:
   an input device (21) for inputting a stop time from when the system stops to when the system next restarts, and the controller (3) further functions to:
   estimate a time from when the system stops to when the fuel cell (11) freezes based on the temperature of the fuel cell (11) and the outside air temperature, and
   not perform the temperature rise operation when the stop time is shorter than the estimated time to freezing.

9. The fuel cell system as defined in claim 2 or 3, wherein the controller (3) further functions to decrease the temperature rise of the fuel cell (11) during temperature rise operation, when the set predetermined temperature is higher than a threshold temperature determined according to the characteristics of the components of the fuel cell (11).

10. The fuel cell system as defined in claim 2 or 3, wherein the controller (3) further functions not to perform temperature rise operation, when the set predetermined temperature is higher than a threshold temperature determined according to the characteristics of the components of the fuel cell (11).

11. The fuel cell system as defined in claim 2 or 3, wherein the cooling mechanism (15–18) cools the fuel cell (11) by supplying a coolant to the fuel cell (11), and the controller (3) further functions to:
perform temperature rise operation of the fuel cell (11) after the coolant has been discharged from the fuel cell (11) when the set predetermined temperature exceeds the boiling point temperature of the coolant.

12. The fuel cell system as defined in any one of claims 1 to 3, further comprising a secondary cell (2) having charging functions, and the controller (3) further functions to charge the secondary cell (2) with power generated by the fuel cell (11) in the temperature rise operation.

13. The fuel cell system as defined in any one of claims 1 to 3, wherein the fuel cell (11) is one of a polymer electrolyte fuel cell and a phosphoric acid fuel cell.

14. A method of stopping a fuel cell system provided with a fuel cell (11) which generates power by an electrochemical reaction and a cooling system (15–18) which cools the fuel cell (11), comprising:
decreasing the cooling performance of the cooling device (15–18) of the fuel cell (11) and continuously operating the fuel cell (11) before the system stops, and
raising the temperature of the fuel cell (11) using the heat generated by the electrochemical reaction of the fuel cell (11).

15. A method of stopping a fuel cell system as defined in claim 14, further comprising:
stopping operation of the fuel cell (11) after the temperature of the fuel cell (11) has risen.

* * * * *